United States Patent Office 3,484,415
Patented Dec. 16, 1969

3,484,415
PROCESS FOR THE PRODUCTION OF FINELY DIVIDED POLYAMIDE POWDERS
Wilhelm August Sahler, Rheinbach, Germany, assignor to Dr. Plate GmbH, Chemische Fabrik, Bonn, Germany, a corporation of Germany
No Drawing. Filed Apr. 25, 1967, Ser. No. 633,365
Claims priority, application Germany, Apr. 30, 1966, P 39,339
Int. Cl. C08g 20/12, 53/02
U.S. Cl. 260—78                                           11 Claims

ABSTRACT OF THE DISCLOSURE

There is provided a process for producing finely divided polyamide powder which comprises heating a solution of the polyamide forming agent and adding, with stirring, an anionic catalyst and an anionic activator, one or both of which are added gradually in several portions at spaced time intervals, and recovering the resulting polyamide powder.

---

The present invention is related to a process for the production of finely divided polyamide powders by anionic polymerization of polyamide forming monomers in an inert solvent at atmospheric pressure and at an elevated temperature and in the presence of usual anionic polymerization catalysts and activators, wherein the catalyst or the activator or both are added to the solution of the polyamide forming monomer or monomers in a particular controlled manner, namely gradually in several portions at regular intervals in a finely divided form or in solution. The obtained finely divided polyamide powders are useful for the production of coatings by whirl sintering, flame spraying, electrostatic coating, for the production of pastes, dispersions and emulsions and of lacquer binders or thermoplastic adhesives.

It is known that powders can be produced from polycaprolactam and polyenanthic lactam by polymerizing the monomers in solution in the presence of sodium metal as catalyst and carbon dioxide as activator (see Die Makromolekulare Chemie Vol. XXXVIII, pages 159–167). Another process for the production of polyamide powders is described in German patent specification No. 1,183,680. A process for the production of polypyrrolidone powder is disclosed in German Auslegeschrift No. 1,203,467.

Unfortunately, these prior art processes are attended by considerable disadvantages. In the first case, it is not readily possible with fairly large batches quantitatively to dissolve the metallic sodium, which inevitably results in considerable fluctuations both in molecular weight and in grain size. In addition, the polymer yields are extremely low. Following removal of the monomeric and oligomeric components, they only amount to about 20% of the theoretical, as shown by comparative tests. Only some 52% of polymer are obtained by the process described in DAS 1,203,467. The process described in German patent specification No. 1,183,680 involves the use of pressure vessels which have to withstand pressures of more than 100 atmospheres. The reaction times quoted in this patent specification are between 6 and 10 hours.

It is an object of the present invention to provide a process for the production of polyamide powder of extremely fine particle diameter in a simple, reproducible manner and with almost quantitative yields on an industrial scale.

Other objects of the present invention and advantages thereof will become apparent as the description proceeds.

The prior art shows that, despite many attempts to resolve it, the object has never yet been reached.

Accordingly, the present invention relates to a process for the production of finely divided polyamide powder by pressureless anionic polymerization in solution in the presence of catalysts and activators, followed by working up, in which the catalysts and/or the activators in finely divided, preferably dissolved form are gradually added to the monomers in several portions introduced at regular intervals. Surprisingly, the problem referred to above is almost ideally resolved by the process according to the invention which is extremely easy to carry out. For example, there is basically no need for the monomer and the solvent to be specially dried and purified. Instead, they may be used in their commercial forms. As already known, an anionic polymerization reaction is one in which alkali metals or alkaline-earth metals or Grignard compounds or organometallic compounds are used as polymerization initiators or, respectively, catalysts.

The solvents normally used for the production of polyamide powder may be employed in the process according to the invention. Examples of such solvents are disclosed in the prior art including British Patents 1,106,351 and 1,108,032. Solvents of relatively low boiling point, such as aliphatic and aromatic hydrocarbons, and, in some cases, aliphatic and aromatic halogenated hydrocarbons, are particularly suitable. The only requirement which the solvent used has to meet is that it should be free of active hydrogen atoms. Relatively low-boiling solvents and solvent mixtures promote the formation of a fine grain. Boiling ranges of from 80 to 150° C. are preferred for the purposes of this invention.

Polymerization usually takes between 2 and 2½ hours to complete, although longer times will be necessary in cases where solvents of the lower boiling range are used.

The catalysts and activators are adapted both to the particular type of starting products used and to the required degree of polymerization, as known per se for the production of polyamides.

Catalysts suitable for use in the process according to the invention include the alkaline catalysts normally used in this branch of industry, such as alkali metal lactams and alkaline-earth metal lactams, Grignard compounds and dispersions of sodium and sodium amide and sodium hydride in inert solvents. Alkali metals and alkaline-earth metals in piece form may also be used, although they are of less significance in regard to their usefulness and effectiveness in obtaining a fine grain distribution, high yield and quick reaction. Sodium amide and sodium hydride in piece form are easier to process.

The yield obtained by the process according to the invention and the degree of polymerization of the polymer powders obtained are largely governed by the fineness of distribution of catalyst and/or the activator. The finest distribution is usually obtained by using solutions of activator and/or catalyst. If the catalyst and/or the activator are liquids which are soluble in or miscible with the solvent used to dissolve the monomer, there will naturally be no need to add the activator and/or the catalyst in the form of a solution because in this case a solution will be formed when the liquid is added. In cases where for some reason or other it is not intended or impossible to use a solution of catalyst and/or activator, for instance because suitable solutions cannot be prepared, they will have to be distributed as thoroughly and finely as possible in some other way. One particularly suitable method of doing this is to precipitate the catalyst and/or the activator from a solution by pouring them into a large quantity of a liquid in which catalyst and/or activator are insoluble, preferably with vivid stirring. In this way, the catalyst and/or the activator will usually accumulate in extremely finely divided or almost colloidal form.

Whereas in cases where a catalyst rubbed finely in the solvent is used only small yields of a material of low molecular weight are obtained, it is possible by dissolving the catalyst in suitable solvents to obtain a quantitative yield. For example, a fine dispersion of sodium caprolactam in gasoline together with a suitable activator only yield 7.8% of a polymer with a molecular weight of 5481. In contrast thereto, a solution of the same catalyst in dimethyl formamide gives a polymer yield of 100% and a molecular weight of about 15,000.

The compounds normally used for the production of "quick" anionic polymers may be employed as activators in the process according to the invention. Activators of this kind include for example acyl lactams such as acetyl and benzoyl lactams, lactam-N-carboxylic acid amides, such as caprolactam-N-carboxylic acid anilide, caprolactam-bis-N-carboxylic acid hexamethylene diamide, aliphatic and aromatic mono- and polyisocyanates, carbodiimides, urethanes, cyanamides, esters, acid anhydrides, organic and inorganic acid halides, for example thionyl chloride, N,N-substituted ureas and esters of nitrous acid. In addition to these, carbamic acid esters of lactams such as caprolactam-N-carboxylic acid ethyl ester, have proved to be suitable activators for the process according to the invention.

It has proved to be of particular advantage for most purposes to use alkali metal lactams in solution in dimethyl formamide as catalysts, and N-acyl derivatives of lactams as activators.

As already mentioned, the success of the process according to the invention is essentially governed by the fineness of distribution of the catalyst. For this reason, it is preferred to use solvent/catalyst/activator combinations of the kind in which the catalyst and/or the activator are present in solution. The solvents must be inert to the extent that they should not react with the monomeric starting product and the polyamide formed.

The fineness of the polymer grain is determined in particular by the following factors:

(1) The controlled, gradual addition of the catalyst and/or the activator.

(2) The temperature level of the solution.

(3) The intensity of agitation during the polymerization reaction.

To obtain a satisfactory result, it is sufficient for the purposes of the invention gradually to add only the catalyst or only the activator in controlled quantities. For example, the total quantity of catalyst may be added to the polymerization mixture in dissolved form from the beginning onwards, and the activator added in several portions. If the activator used is a solid, it should be added in dissolved form in order to obtain an extremely fine distribution.

The number of additions varies in accordance with the type of starting products used. Generally, it is necessary in order to obtain satisfactory results to add the activator and/or the catalyst in about three portions at least and preferably in about seven portions. This gradual addition should take place at intervals of at least about 5 minutes and preferably at intervals of about 15 minutes. The agitation of stirring speed is with advantage fairly high, for example between 400 and 1000 r.p.m. for a stirrer diameter of 0.25 m. in order to avoid the formation of a skin around the hot walls of the reaction vessel.

It is also possible in accordance with the invention to use mixtures of catalysts and/or activators. The total quantity of catalyst amounts to at least about 1% and preferably to between 2 and 2.5%, based on the weight of the monomer used. The total quantity of activator amounts to between 0.5 and 5%, based on the weight of the monomer.

The process according to the invention is particularly suitable for the production of polyamide powder in finely divided form from lactams containing between 6 and 12 carbon atoms. As already mentioned, commercial lactams may be used as the starting products.

The polymer formed is worked up as known per se. Generally, it is separated from the solution by filtering or centrifuging. For certain applications, it is of advantage to wash the powder separated from the solvent with alcohols, preferably methanol, in order to remove the monomeric components. The finely divided polyamide powders produced in accordance with the invention have outstanding properties which enable them to be used to great effect for a variety of industrial processes in which polyamide powders are required. Such processes include for example fluidization or whirl sintering, flame spraying, electrostatic coating, the production of pastes, dispersions and emulsions and the production of lacquer binders and thermoplastic adhesives.

The invention is illustrated by the following examples without however limiting the same thereto.

Example 1

This example shows that, if the catalyst is inadequately distributed, both the yield and molecular weight are unsatisfactory.

40 g. of lauric lactam are dissolved by heating under reflux in 100 ml. of a gasoline fraction boiling at 100–140° C., 0.46 g. (1/100 mol) of caprolactam-N-carboxy anilide being added to the resulting solution with vigorous stirring. After a brief contact time (2–3 minutes), 0.54 g. (1/100 mol) of a fine rubbing of sodium caprolactam in gasoline boiling at 100–140° C. is added. The temperature of the solution is approximately 135° C. A fine powder is gradually formed and after a reaction time of 60 minutes is separated from the solvent by suction filtration. The yield comprises 3.1 g. (7.8% of the theoretical). The molecular weight, as determined by the solution method, only amounts to 5481, the monomer content being 0.64%.

Example 2

This example shows that a considerable increase in yield and a rise in molecular weight can be obtained by distributing the catalyst much more finely by dissolving it in a suitable solvent, and gradually adding it. It is precipitated from the original solution in extremely finely divided form by addition to the monomer solution in gasoline.

15 g. of lauric lactam are dissolved under reflux in 60 ml. of a gasoline fraction boiling at 100–140° C., 0.2 g. of caprolactam-N-carboxylic acid anilide being added with stirring to the resulting solution. 0.2 g. of sodium caprolactam are dissolved by heating in 10 ml. of dimethyl formamide, half the solution is added to the reaction mixture, the other half being run in after a contact time of 15 minutes. After a reaction time of 60 minutes, 6 g. (40% of the theoretical) of a white polyamide powder are obtained. Its molecular weight is 16,200 and its monomer content 2.76%. The pwoder is relatively course (particle size approx. 300μ. Lengthening the reaction time does not produce any increase in yield.

Example 3

This example shows that a further considerable increase in yield can be obtained by increasing the catalyst and activator components and by adding them in alternation. The procedure is as described in Examples 1 and 2, except that four fractions each comprising 1% of catalyst and activator based on the weight of the monomer added, are added in alternation at intervals of 10 minutes. After a total reaction time of four hours, a fine white polymer powder is obtained in a yield of 82% of the theoretical. The powder has a relative viscosity of 1.365, its monomer content still being 5.08%.

Example 4

This example shows that favourable results are obtained if, in contrast to the procedure described in the preceding examples, the catalysts dissolved in dimethyl formamide are added first and the activator gradually added in controlled quantities at regular intervals.

500 g. of lauric lactam are dissolved by heating under reflux with stirring in 500 ml. of a gasoline fraction boiling at 100–140° C. 20 g. of sodium caprolactam are then dissolved in 50 ml. of dimethyl formamide and the resulting solution is added to the mixture all at once. After a short contact time, a solution of 10 g. of caprolactam-N-carboxylic acid anilide in 50 ml. of benzene is added in seven portions at 15-minute intervals with continued stirring and heating. At the end of the appropriate reaction time, the reaction product is suction-filtered and washed with hot methanol, giving a yield of 502 g. (100% of the theoretical, based on the weight of the monomer used). The excess 2 g. emanate from the catalyst and activator components.

Characteristics:
- Melting range _____ 177–178° C.
- Molecular weight _____ 16,210.
- Relative viscosity _____ 1.648.
- Monomer content _____ 0.16.
- Average particle size _____ 25μ

The powder thus obtained forms a firmly adhering sintered film on a steel plate heated to between 200 and 300° C.

Example 5

*Preparation of a mixed polyamide.*—75 g. of caprolactam and 75 g. of lauric lactam are polymerized together by the method described in Example 4. After a total reaction time of 2½ hours, 92.5% of the theoretical of the mixed polyamide powder are obtained.

Characteristics:
- Melting range _____ 181–186° C.
- Molecular weight ____ 10,810.
- Relative viscosity ___ 1.445.
- Monomer content ___ 3.04% lauric lactam, 1.52% caprolactam.
- Grain size _____ 30–50μ.

Example 6

The mixture used for Example 5 is modified by replacing the solution of caprolactam-N-carboxylic acid anilide with 3 g. of a similar solution of N-acetyl caprolactam. The yield of white powder comprises 92% of the theoretical.

Characteristics:
- Melting range _____ 191–194° C.
- Molecular weight _____ 11,500.
- Relative viscosity _____ 1.52.
- Monomer content _____ 3.2% lauric lactam, 1.4% caprolactam.
- Grain size _____ 30–35μ.

Example 7

*Preparation of a ternary mixed polyamide.*—60 g. of caprolactam, 60 g. of lauric lactam and 30 g. of caprylactam are dissolved by heating while stirring in 150 ml. of a gasoline fraction boiling at 100–140° C., and the resulting solution is polymerized as described in Example 4. 3 g. of N-carbethoxy-caprolactam are used as activator. The yield amounts to 97% of the theoretical.

Characteristics:
- Melting range _____ 127–137° C.
- Molecular weight _____ 9,864.
- Relative viscosity _____ 1.38.
- Monomer concentration 2.1% lauric lactam, 1.2% caprolactam.
- Grain size _____ 40–50μ.

Application.—Preferably as a thermoplastic adhesive.

Example 8

The reaction mixture is prepared and polymerization is carried out in the manner described in Example 7, the only difference being that 3 g. of caprolactam-N-carboxylic acid anilide are used in place of N-carbethoxy-caprolactam and a mixture of gasoline and benzene in a ratio of 3:1 is used in place of the gasoline. The yield comprises 99.0% of the theoretical.

Characteristics:
- Melting range _____ 143–145° C.
- Molecular weight _____ 15,237.
- Relative viscosity _____ 1.616.
- Monomer content ____ 0.87% caprolactam.
- Grain size _____ 12–20μ.

Example 9

500 g. of lauric lactam are dissolved by heating while stirring in a mixture of 400 ml. of a gasoline fraction boiling at 100–140° C. and 100 ml. of benzene. Following the introduction of 9.63 g. of a 30% dispersion of sodium amide in toluene, the mixture is left to react for half an hour, after which time 10 g. of caprolactam-N-carboxylic acid anilide in 50 ml. of benzene are added in seven equal portions at 15-minute intervals. Working up gives a polylauric lactam powder similar to sand in texture in a yield of 95% of the theoretical.

Characteristics:
- Melting range _____ 162° C.
- Molecular weight _____ 19,114.
- Relative viscosity _____ 2.009.
- Monomer content ____ 4.5%.
- Grain size _____ 100–150μ

Example 10

500 g. of caprolactam are dissolved in 500 ml. of toluene, 33 g. of a 30% dispersion of sodium metal in toluene being added to the resulting solution. On completion of the reaction, a solution of 10 g. of caprolactam-N-carboxylic acid anilide in 50 ml. of benzene is added in seven portions at 15-minute intervals. The colourless polymer powder formed is obtained in a yield of 94% of the theoretical.

Characteristics:
- Melting range _____ 212° C.
- Molecular weight _____ 8,560.
- Relative viscosity _____ 1.38.
- Monomer content ____ 3.57%.
- Grain size _____ 25–30μ.

What I claim is:

1. A process for the production of finely divided polyamide powder comprising heating a solution of a polyamide forming agent selected from the group consisting of lactams having from 6 to 12 carbon atoms in an inert solvent to a temperature in the range of about 80° C. to about 150° C., adding thereto with stirring an anionic polymerization catalyst and an anionic polymerization activator, said catalyst being dissolved or dispersed in an inert solvent which is nonreactive with the monomeric starting product and the polyamide formed, and said activator being dissolved in an inert solvent also nonreactive with the monomeric starting product and the polyamide, at least one of the group consisting of said catalyst and said activator being added in individual portions at substantially regular spaced time intervals, and separating the obtained finely divided polyamide powder from the reaction mixture.

2. A process as claimed in claim 1, wherein gradual adding is effected in at least about 3 portions, and at intervals of at least about 5 minutes.

3. A process as claimed in claim 2, wherein gradual adding is effected in about 7 portions and at intervals of about 15 minutes.

4. A process as claimed in claim 1, wherein the anionic polymerization catalyst is an alkali-metal lactam.

5. A process as claimed in claim 4, wherein the alkali-metal lactam catalyst is prepared in situ by adding a dispersion of a member selected from the group consisting of sodium metal, sodium amide and sodium hydride, to the reaction solution.

6. A process as claimed in claim 1, wherein the total amount of catalyst is added to the reaction mixture in dissolved form and the activator likewise in dissolved or in liquid form is added gradually in at least about 3 portions and at intervals of at least about 5 minutes.

7. A process as claimed in claim 6, wherein the activator is added in about 7 portions and at intervals of about 15 minutes.

8. A process as claimed in claim 1, wherein the anionic polymerization catalyst is a N-acyl derivative of a lactam.

9. A process as claimed in claim 1, wherein the catalyst is used in a quantity of at least about 1%, based on the weight of the monomer used.

10. A process as claimed in claim 9, wherein the catalyst is used in a quantity of about 2 to 2.5%, based on the weight of the monomer used.

11. A process as claimed in claim 1, wherein the activator is used in a quantity of about 0.5 to 5%, based on the weight of the monomer used.

References Cited

UNITED STATES PATENTS

| | | | |
|---|---|---|---|
| 2,907,755 | 10/1959 | Lautenschlager et al. | 260—78 |
| 3,017,391 | 1/1962 | Mottus et al. | 260—78 |
| 3,061,592 | 10/1962 | Schnell et al. | 260—78 |
| 3,298,977 | 1/1967 | Robertson et al. | 260—78 |
| 3,325,455 | 6/1967 | Warner | 260—78 |
| 3,394,112 | 7/1968 | Stoll et al. | 260—78 |

FOREIGN PATENTS 1,027,336  4/1966  Great Britain.

HAROLD D. ANDERSON, Primary Examiner

U.S. Cl. X.R.

260—95